United States Patent [19]

Stange

[11] 3,723,981

[45] Mar. 27, 1973

[54] PNEUMATIC ACCESSING OF TAPE BANDS

[75] Inventor: Klaus K. Stange, Phoenix, Ariz.

[73] Assignee: Honeywell Information Systems Inc., Oklahoma City, Okla.

[22] Filed: July 17, 1962

[21] Appl. No.: 219,519

[52] U.S. Cl. ..................340/174.1 C, 226/95, 226/97

[51] Int. Cl. ..............................................G11b 15/38

[58] Field of Search ....................340/174.1 C, 174.1; 179/100.2 P, 100.2 Z; 226/95, 97

[56] References Cited

UNITED STATES PATENTS

| | | | |
|---|---|---|---|
| 3,107,346 | 10/1963 | Darwin et al. | 340/174.1 |
| 2,927,789 | 3/1960 | Walsh et al. | 226/97 |
| 2,980,355 | 4/1961 | Cannings | 226/95 |
| 3,112,473 | 11/1963 | Wicklund et al. | 226/95 |
| 2,866,637 | 12/1958 | Pendleton | 179/100.2 |
| 3,286,895 | 11/1966 | Poumekis | 226/95 |
| 3,184,131 | 5/1965 | Fieldgare | 226/97 |
| 3,110,431 | 11/1963 | Potter et al. | 179/100.2 P |

OTHER PUBLICATIONS

Handen, "Magnetic Tape Loop Auto-Load Memory," IBM Tech. Disc. Bul., Vol. 3 No. 12, 5/61

*Primary Examiner*—Vincent P. Canney
*Attorney*—Fred Jacob and Edward W. Hughes

[57] ABSTRACT

An endless loop or barn of magnetic tape is selectively withdrawn from its bin into a chamber wherein it is caused to move by a rotating capstan.

29 Claims, 9 Drawing Figures

INVENTOR.
KLAUS K. STANGE.
BY William C. Cahill
ATTORNEY.

INVENTOR.
KLAUS K. STANGE.
BY
William C. Cahill
ATTORNEY.

INVENTOR.
KLAUS K. STANGE.
BY William C. Cahill
ATTORNEY.

Patented March 27, 1973

3,723,981

4 Sheets-Sheet 4

INVENTOR.
KLAUS K. STANGE.

BY William C. Cahill

ATTORNEY.

PNEUMATIC ACCESSING OF TAPE BANDS

This invention pertains to information storage and retrieval systems, and more particularly, to endless loop multiple cartridge selective access information storage and retrieval systems.

In the present state of the computer and data processing art there is a need for large capacity storage media with random access capabilities. Present solutions to this need are generally very expensive so that the cost per binary digit limits the capacity of the storage system. The need for such storage systems may be illustrated by the following.

In many conventional electronic data processing applications, there are a large number of master file records, each record containing information about a particular account. These master file records are, in a typical case, contained on reels of magnetic tape in numerical order to ascending key or account numbers. Periodically, the master file records are updated by the incorporation of data from transaction file records. The transaction file records are made up of additions of new or deletions of old master file records or data for updating existing master file records. Typically, the transaction file records are also in sequential order on magnetic tape or some other temporary storage medium.

The file updating is performed by retrieving a master file record from the master tape and reproducing it in the main computer memory. A transaction-file record is then read into the computer memory. A comparison is made of the account numbers. If the account numbers are equal, then the master file record is updated with the information contained in the transaction record. If the master file account number is greater than the transaction account number, a check is made to see if the transaction item is an addition to the master record. It it is not, then an error exists. If the transaction is not an addition, the master file account numbers being interrogated cannot become greater than the transaction account number unless one of the files is out of sequential order.

If the comparison indicates that the transaction file number is greater than the master file number, then a new master file record is read from the master file tape into the computer memory and the comparison is again made. Assuming, for example, that there are only a few transaction records compared to the number of master file records, comparisons will have to be made with all of the master file records in sequence until the correct master file is found and the updating process can take place. If there were only a few transaction file records and an entire tape reel of master file records, the processing procedure would require the interrogation of the entire master file tape reel in order that the few master file records could be updated.

It can be seen that a considerable amount of computer time can be saved if, after the first transaction file record has been read into memory, the location on the master file tape which contains the master file record corresponding to the transaction file record could be addressed immediately. As suggested previously, there has been considerable effort in the data processing field in trying to find solutions to this problem. One solution to the problem is a change from magnetic tape to magnetic disks or magnetic drums as the storage medium. Although these types of master file storage media solve the problem of obtaining selective access capabilities, the increase in price over magnetic tape storage systems is, in many situations, prohibitive.

Therefore, a technological breakthrough in information storage technique has been sought which would combine:

1. large information storage capacity,
2. low cost per unit of storage capacity, and
3. low access time to selected information while maintaining a constant interrogation rate.

The first two of these features are met in conventional magnetic tape transport devices; the first and third are met in magnetic disk and magnetic drum type storage systems. There was, however, no device that combined all of these features.

It is therefore an object of this invention to provide an information storage system having a large storage capacity, low cost per unit capacity, and a low average access time.

It is another object of this invention to provide a linear access memory utilizing magnetic tape as the information storage media.

It is still another object of this invention to provide an information storage system utilizing multiple cartridges, each containing a portion of the information storage media.

It is a further object of this invention to provide an information storage medium cartridge for use in an information storage system.

It is still a further object of this invention to provide an information storage system having means whereby tension in a flexible storage medium such as magnetic tape is maintained con-stant.

Further objects and advantages of the present invention will become apparent to those skilled in the art as the description thereof proceeds.

Briefly stated, in accordance with one embodiment of this invention, an information storage system is provided having a plurality of cartridges each containing an endless loop of magnetic tape. The system is also provided with a tape transport comprising a magnetic transducer, a continuously rotating capstan, and two vacuum chambers positioned to maintain the tape loop in operable contact with the capstan and the magnetic transducer. The tape transport chosen for illustration has 10 cartridge mounting posts on which 10 individual cartridges may be mounted so that any of the 10 individual tape loops can be selected to be transported and interrogated. The device is so constructed that any one or more of the cartridges may be removed while the system is being operated. Different cartridges may be either manually or automatically mounted in the transport for later use. Upon command, the tape is pneumatically extracted from the cartridge except for a small loop of the tape which is wrapped around the cartridge mounting post.

When the tape is extracted from one of the cartridges, a loop of the tape is drawn into each of the two vacuum chambers located on either side of the capstan and transducer. A vacuum in the two chambers creates tension in the tape and holds the tape in frictional contact with the capstan and in position so that the magnetic transducer can read, write or erase coded magnetic information on the magnetic tape surface. An air bearing sleeve is provided with means to transmit air from the tape transport device through a post on which the cartridge is mounted. This flow of air will create an air bearing on which the tape will ride when the tape is being transported by the capstan.

Upon command, a tape loop being transported by the capstan is pneumatically retracted into its individual cartridge without changing the speed of the capstan. After the tape is retracted, the system is ready to select and interrogate information on any of the other tape loops which are in cartridges mounted in the system. While one tape loop is being transported and interrogated, any of the other tape cartridges may be removed without disrupting the air flows or pneumatic pressures which maintain the tape loop tension and air bearings.

The vacuum chambers are so constructed that there is automatic throttling of the air flow around the tape which keeps a constant tape length in each of the vacuum chambers and maintains a constant tension in the tape.

The invention, both as to its organization and method of operation, together with further objects and advantages thereof, may best be understood by reference to the following drawings, in which like reference numerals indicate like parts, and in which.

Figure 3:
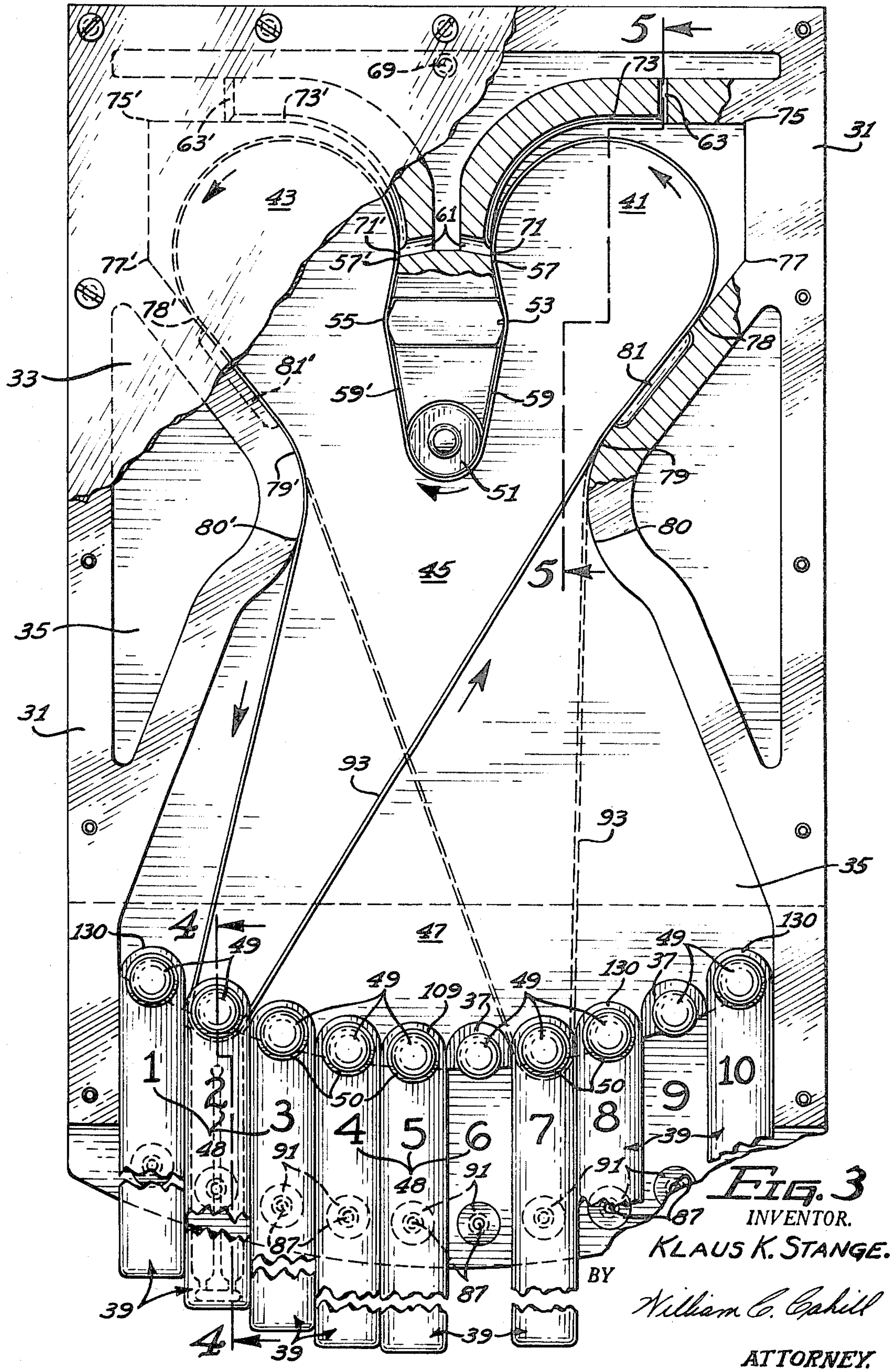
FIG. 3 is a front view, partially in section and partially broken away, of an information storage and retrieval system constructed in accordance with the teachings of the present invention.
Figure 9:
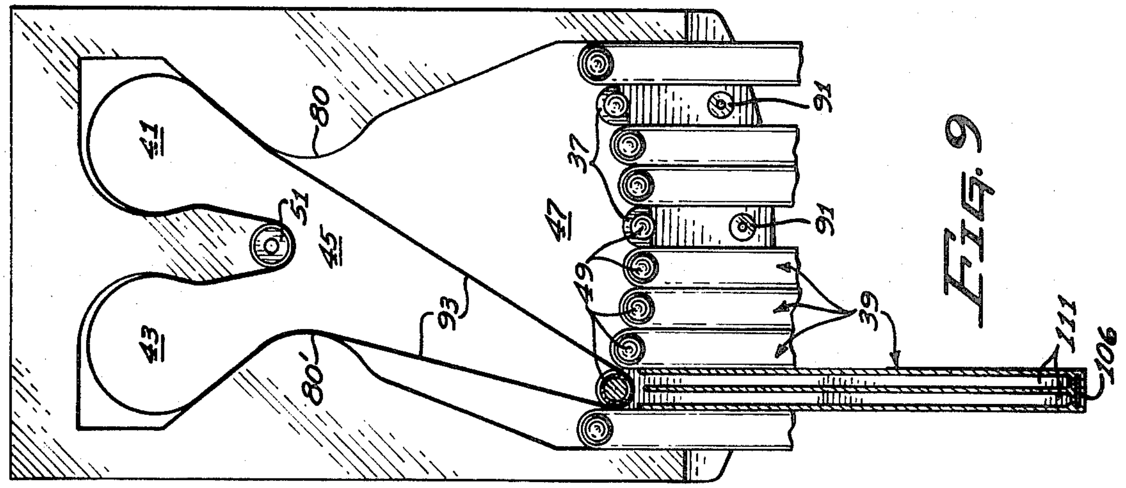
Figure 8:
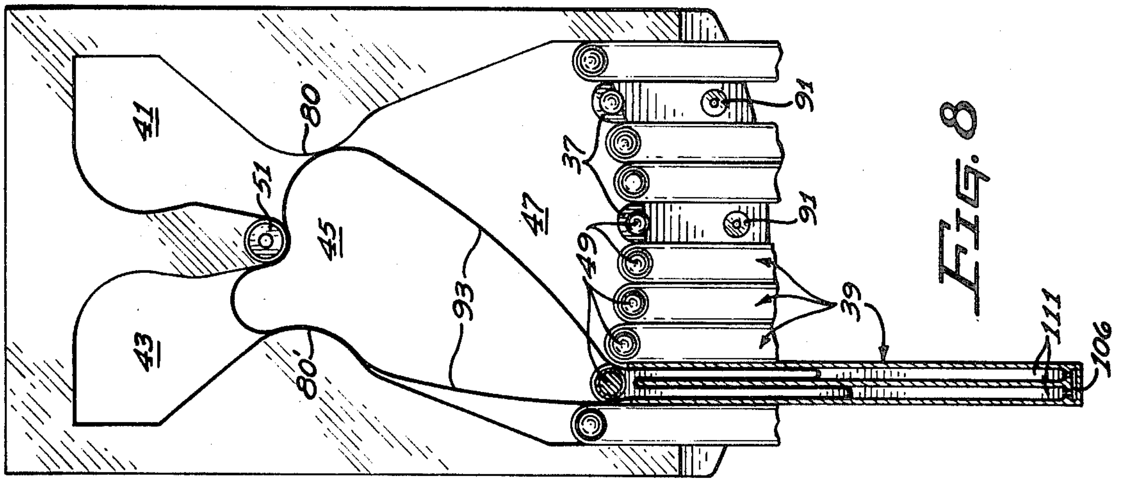
Figure 7:
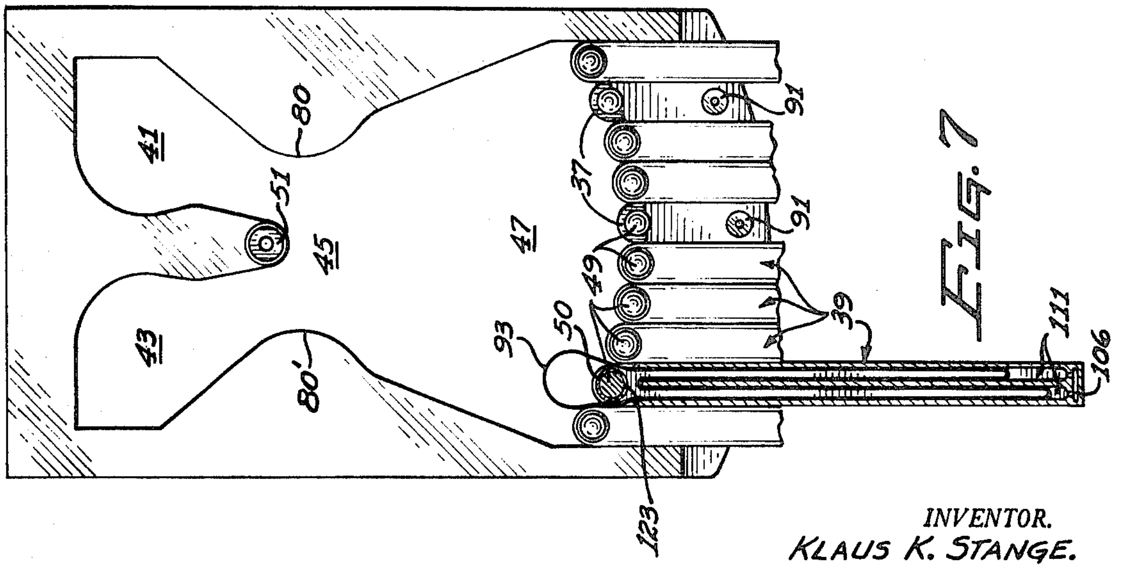

FIGS. 7, 8, and 9 are simplified front sectional views of the information storage and retrieval system as shown in FIG. 3, each illustrating successive configurations of the tape as it is extracted from or retracted into the cartridge.

Figure 1:
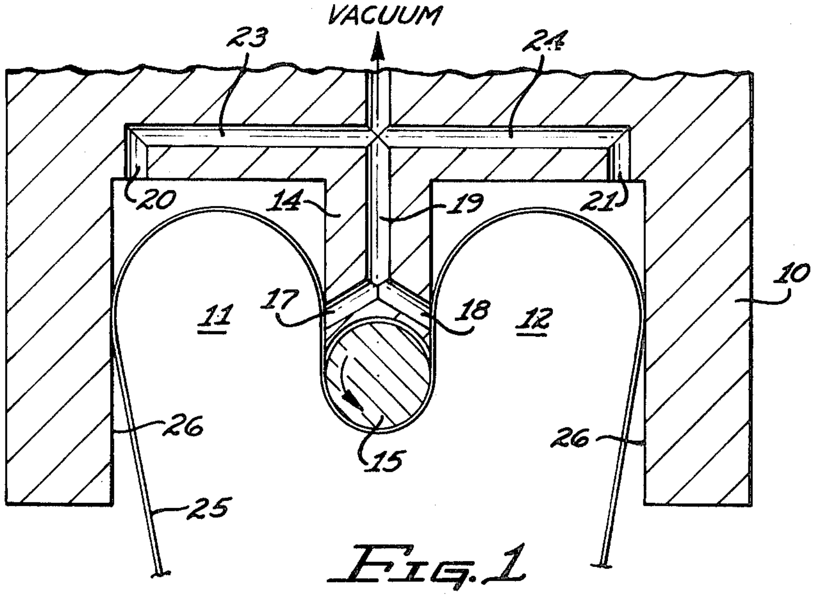
FIG. 1 is a schematic illustration of a web transporting apparatus illustrating one embodiment of the present invention.

Referring to FIG. 1, a schematic illustration of one embodiment of the present invention is shown. An encasing member 10 is formed to provide two chambers 11 and 12. The chambers 11 and 12 are separated by a partition 14 and a web transporting device such as a capstan 15. The capstan 15 may be continuously rotating so that whenever web material comes in contact therewith, it will be transported. The chambers 11 and 12 are provided with ports 17 and 18, respectively, which are connected via channel 19 to a source of vacuum (not shown).

Each of the chambers 11 and 12 is also provided with a second port 20 and 21, respectively, which, in a manner similar to ports 17 and 18, are connected to a source of vacuum via channels 23 and 24. A flexible web 25 may be positioned within the chambers 11 and 12 as shown in FIG. 1; the angle formed by the web material 25 with walls 26 of the encasing 10 at the tangent points of contact is sufficiently small to prevent the collapse of the loops formed by the web material in the chambers 11 and 12. This angle may be in the order of 5° or less. The web material forms a partial seal with the bottom and top faces (not shown) of the encasing member 10. These faces are parallel with the plane of the drawings and are spaced apart only slightly greater than the width of the web material.

The operation of the device shown in FIG. 1 is as follows. The vacuum applied to channels 19, 23, and 24 result in a lowered pressure on the upper side of the web material 25, thus causing the latter to extend into the chambers 11 and 12. Air in each of the loops escapes around the edge of the web material and enters the upper, or low pressure side of the web in the chambers. The vacuum, transmitted to the chambers through ports 17, 18, 20 and 21 holds the web in constant tension against the rotating capstan 15. The web material is thus transported at the surface speed of the capstan 15. The loops of web material in the chambers 11 and 12 are balanced by the action of the throttling of the vacuum through ports 17 and 18. For example, if the loop of the web material 25 in chamber 11 were shortened, a greater portion of the port 17 would be exposed to the low pressure side of the web material thus permitting a greater volume of air to enter the port 17. The increased air flow through the port 17 effectively reduces the pressure on the low pressure side of the tape loop in chamber 11 thus increasing the force on the tape loop tending to draw the loop further into the chamber 11. As the loop is drawn into the chamber 11 because of the increased force, the port 17 is once again covered to a greater extent, thereby reducing the air flow through the port 17. As a result of the interaction of the location of the tape loop in chamber 11 and the throttling of the air through the port 17, the loop in chamber 11 is maintained at a given position depending on the overall length of the web material and the tension on the web material.

It may be seen that chamber 12 is substantially a mirror image of chamber 11 and that the same balancing effect between the throttling of the air flow through port 18 and the length of the tape loop in chamber 12 is identical to that described in connection with chamber 11. The total effect of the balancing forces in chambers 11 and 12 maintains the loops in each of the chambers at a substantially constant position while the web material is being transported from one chamber past the capstan 15 to the other chamber. It may be seen from this description that vacuum ports 20 and 21 are not absolutely necessary since the balancing action depends entirely on the ports 17 and 18; however, the ports 20 and 21 are useful for drawing the web material 25 into the chambers 11 and 12 during the loading of the web material in the apparatus.

As noted in connection with FIG. 1, the angle between the side wall of the chamber and the web material as it contacts the wall must be sufficiently small to prevent the loop in the respective chamber from collapsing. This angle is approximately 5° or less. To enable the web material to contact the side walls with an angle of 5° or less, and still permit the web material to be transported through the chambers from a plurality of points outside of the chambers, the chamber wall configuration may be altered as shown in FIG. 2.

Figure 2:
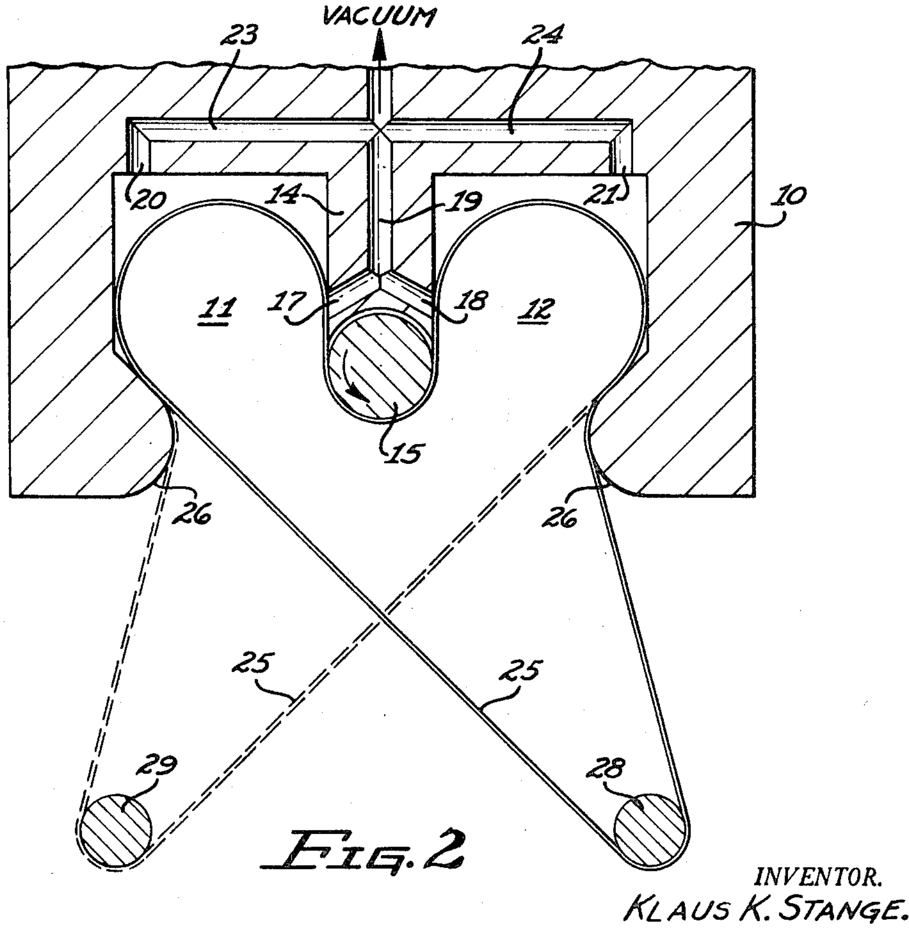
FIG. 2 is a schematic illustration of a web transporting apparatus illustrating another embodiment of the present invention.

Referring to FIG. 2, the chamber walls 26 in the vicinity of the web material contact are curved to insure that the angle of contact between the web material and the chamber wall is 5° or less regardless of the angle of entry of the web material into the respective chambers. Corresponding elements in FIG. 2 are numbered with their like elements of FIG. 1. It may be seen from an inspection of FIG. 2 that the web material 25 may travel about an external pivot arrangement, such as for example pulley or air bearing 28, positioned to the right of both chambers. Similarly, the web material 25 may be arranged to travel about a different external pivot 29 positioned to the left of both of the chambers. In the latter instance, the web material is shown in dotted lines.

The operation of the device of FIG. 2 is identical to that of FIG. 1 with the exception that no restriction is placed on the position of the web material as it enters the chambers 11 and 12; therefore, the angle of contact at the tangent point of the web material with the wall of the chambers will always be 5° or less within wide limits of the positioning of the web material as it enters the chambers.

FIG. 3 is an information storage and retrieval system employing the concepts illustrated in FIGS. 1 and 2 in combination with additional concepts including selective access to the information stored on multiple endless tape loops.

Referring to FIG. 3, the region of the system in which the magnetic tape is transported is enclosed by an outer casing 31, front wall 33, back wall 35, mounting post covers 37, and tape cartridges 39. This region includes vacuum chambers 41 and 43, capstan region 45, and mounting post region 47, and is, except for control pressure or air flow ports (to be described later), a pneumatically sealed chamber.

In the embodiment chosen for illustration, there are ten cartridge mounting positions each marked with mounting position numbers 48. Each cartridge mounting position has associated with it a cartridge mounting post 49 and a mounting post cover 37. The individual cartridges each have a mounting sleeve 50 which may be placed over the corresponding mounting posts 49. As can be seen in the illustration of FIG. 3, there are eight tape cartridges 39 in place in the system in mounting positions 1, 2, 3, 4, 5, 7, 8, and 10 while mounting positions 6 and 9 are vacant. The installation of a tape cartridge at position 9 pushes the mounting post cover 37 associated with that position toward the back of the system; the cartridge at position 9 then occupies the space previously occupied by the cover. The cover is spring loaded in the extended position as shown at positions 6 and 9 so that removal of a cartridge will permit the cover to again assume its extended position. Each of the mounting post covers 37, when there is no cartridge present in the cartridge mounting position, forms a pneumatic seal with the adjacent mounting post cover or, if a cartridge is present at the adjacent position, forms a pneumatic seal with the adjacent cartridge.

Vacuum chambers 41 and 43 are essentially mirror images of each other and are located on opposite sides of a capstan 51 and magnetic transducer 52. The transducer 52 comprises read head 53 and multiple gap write and read-after-write head 55.

On either side of read head 53 and also on either side of write and read-after-write head 55 there are provided tape tension stabilizing plates 57 and 59. These tape tension stabilizing plates are plain surfaces which provide a smooth approach to, and departure path from, transducer heads 53 and 55.

The vacuum chamber description will be limited to a description of vacuum chamber 41; the description of vacuum chamber 43 is similar and may be understood by merely reading "primes" on the reference numerals. Vacuum chamber 41 is provided with ports 61 and 63 which pneumatically connect the vacuum chamber to vacuum chamber manifold 65. Vacuum chamber manifold 65 is pneumatically connected to a suitable source of vacuum (not shown) through vacuum chamber manifold port 69. The vacuum source can be any standard means for maintaining a constant vacuum pressure in vacuum chamber manifold 65. The wall of vacuum chamber 41 from the point marked 71 to the point marked 73 is circular while the vacuum chamber walls from points 73 to 75 to 77 to 79 are straight plane surfaces. There is, however, a slot 81 in the plane wall surface between points 77 and 79 extending normal to the section of FIG. 3. Each of the ports 61 has corresponding thereto a port 63 and a vacuum chamber air groove 83. The grooves 83 extend along the portion of the curved and straight chamber walls between the ports 61 and 63.

Looking again at the cartridge mounting positions 1–10, individual cartridges are mounted by sliding mounting sleeve 50 over mounting post 49. When a cartridge 39 is in place, a cartridge air duct port 87 is pneumatically sealed to the cartridge by seal 91. This pneumatic seal enables pneumatic pressures to be transmitted to the cartridge as will be described later.

An endless loop of magnetic tape 93 is shown in normal operating position in the system corresponding to a selection of the tape cartridge in position 2. Shown by dotted lines is a tape loop in normal operating position selected from the cartridge in position 7. The cartridge mounting post arrangement is such that the tape length below an imaginary line connecting points 79 and 79′ is the same for a tape loop extracted from a cartridge in any of the ten mounting positions.

Figures 4, 5, 6:
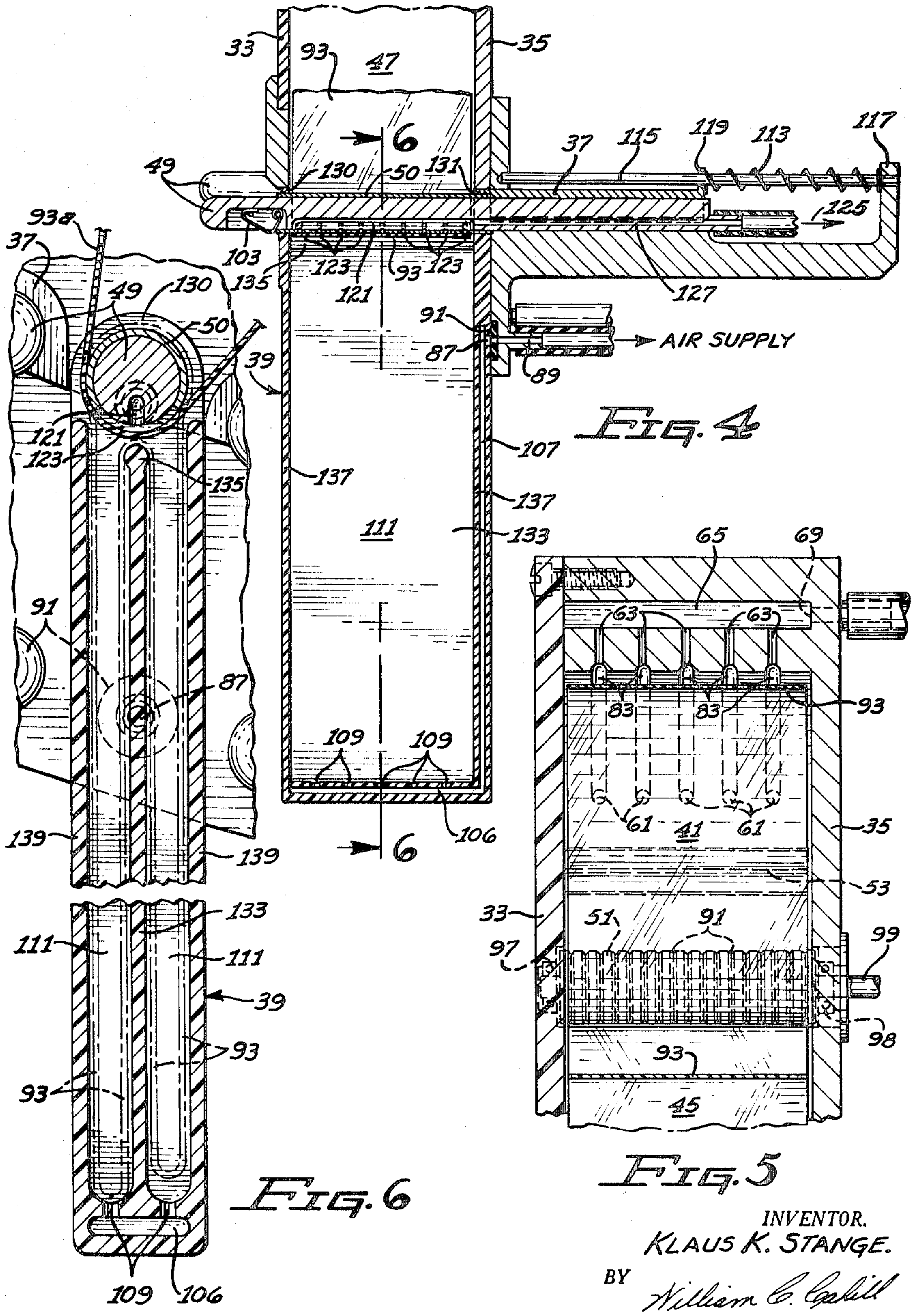
FIG. 4 is a cross-sectional view of the information storage and retrieval system of FIG. 3 taken along the section 4—4 showing details of the tape storage cartridge.
FIG. 5 is a cross-sectional view of the information storage system of FIG. 3 taken along section 5-5 showing the capstan, transducer, and vacuum chamber configurations of the tape storage cartridge.
FIG. 6 is a cross-sectional view of the cartridge shown in FIG. 4 taken along section 6—6.

Referring to FIG. 5, vacuum chamber air grooves 83 are essentially semicircular in cross section with a diameter equal to that of vacuum chamber ports 61. Ports 63 are considerably smaller in size than ports 61 so that a much greater portion of a pneumatic pressure equalization air flow between vacuum chamber 41 and vacuum chamber manifold 65 will be effected through ports 61 rather than ports 63. The reason for the difference in size between ports 63 and ports 61 will become apparent during the description of operation of the device shown in FIG. 3. Capstan 51 is rotatably mounted in bearing supports 97 and 98 and driven by a constant speed driving means (not shown) through shaft 99. The capstan 51 is provided with a plurality of capstan surface air grooves 101 each extending circumferentially around the capstan in a plane normal to the capstan axis.

Referring to FIG. 4, a cartridge 39 is mounted in one of the mounting positions by sliding mounting sleeve 50 over cartridge mounting post 49 until mounting post latch 103 falls into its spring loaded "latched" position. With the cartridge properly mounted, cartridge air duct port 87 is pneumatically connected to a cartridge air supply (not shown) by cartridge air supply line 89 and seal 91. Cartridge air duct port 87 transmits pneumatic pressures from the cartridge air supply to cartridge storage chamber air manifolds 106 through cartridge air duct 107. Manifold 106 is pneumatically connected to tape storage chambers 111 through cartridge air manifold ports 109. When the cartridge is mounted, it pushes mounting post covers 37 into a stored position behind the cartridge. Mounting post covers 37 are spring loaded by a compression spring 113 which is helically mounted around spring shaft 115 to thereby urge the mounting post covers into their extended position. The spring 113 is restrained by a shaft mounting plate 117 and a mounting post cover lug 119.

Lug 119 also serves as a guide arranged to slide on shaft 115 to assure that the spring force is directed parallel to mounting post 49. Mounting post air manifold 121 is a longitudinal slot in the lower portion of mounting post 49 and extends the length of cartridge mounting sleeve 50. Manifold 121 supplies a flow of air through air bearing slots 123 in the cartridge mounting sleeve 50 to provide an air bearing on which the endless loop of tape will ride when it is transported by the capstan.

Mounting post air supply 125 (not shown) is pneumatically connected to manifold 121 by mounting post air supply line 127 to maintain proper pressures in manifold 121 and proper air flow through air bearing slots 123.

Cartridge 39, when in place, pneumatically seals the information storage and retrieval system from the outside atmosphere by cartridge flange seals 130 and 131. Each cartridge mounting position is sealed from the adjacent positions either by a cartridge or mounting post cover (FIG. 6). Mounting post cover 37 extends around mounting post 49 substantially more than 180° to assure that the covers will slide on the mounting post without becoming misaligned.

Referring to FIG. 6, cartridge 39 encloses two tape storage chambers 111, separated by an inner partition 133. The partition 133 extends up from the bottom of the cartridge almost to cartridge mounting sleeve 50, the upper extremity of the partition being inner partition tape support 135. In the "stored" position, the tape 93 (shown by broken lines in FIG. 6) is looped over the upper portion of cartridge mounting sleeve 50 and inner partition tape support 135. The tape forms two lower loops, one in each of the storage chambers 111. When the tape is drawn out of the cartridge 39, shown in FIG. 6 at 93a, the cartridge mounting sleeve 50 acts as an air bearing for the tape as it travels over the sleeve.

Each cartridge may be equipped with its own removable plastic snap-on top (not shown) which covers and seals the upper portion of cartridge mounting sleeve 50 when the cartridge is stored on a shelf ready for insertion in the information storage and retrieval system. Thus, the magnetic tape is sealed from dust and dirt while it is mounted in the system and also when it is stored on a shelf.

The operation of the information storage and retrieval system is as follows. When an endless tape loop 93 is in the stored position in the system, cartridge air duct port 87 transmits a pneumatic vacuum through cartridge air duct 107 to cartridge storage chamber air manifold 106, and through cartridge air manifold ports 109 to the two storage chambers 111. There is a partial pneumatic seal between the edges of the tape and the cartridge side walls 137 (FIG. 4) so that the vacuum transmitted to port 109 will pull the tape into the chambers 111. The tape will form two loops and one of the loops will "bottom" and cover port 109 while the other loop will be held at a near bottom position. Cartridge mounting sleeve 50 serves as a conduit of air from cartridge mounting post air supply 125 to mounting post air manifold 121 and through slots 123. Air from these slots serves to give an air bearing on which the tape rides around sleeve 50 when the tape from the particular cartridge is being transported. Front plate 33 and back plate 35 are parallel surfaces spaced apart a distance slightly greater than the width of the tape 93 such that when the tape is being transported by the capstan 51 there is a partial pneumatic seal between the tape edges and the parallel surfaces 33 and 35.

Upon selection of a particular tape loop, vacuum on the selected tape storage chamber 111 is released, and a slight positive pressure (greater than atmospheric) is introduced through ports 109 destroying the tension on the tape loops in the storage chambers. The elimination of tape tension coupled with air pressure being applied at slots 123, causes the upper tape loop wrapped around cartridge mounting sleeve 50 to be lifted away from the sleeve into the mounting post region 47. As the tape enters mounting post region 47, a loop or "-bubble" is formed in the tape; as the bubble of tape is extracted from the cartridge and approaches capstan region 45, low pneumatic pressures in the vacuum chambers will be effective to extract the tape more rapidly. Even if there is no vacuum pressure present in capstan region 45 as the tape is being extracted, the bubble will be formed as described above, and as the bubble becomes larger, the differential pressure (caused by the positive pressure within the bubble) acting on the tape will be acting over a larger and larger area of tape which in turn will increase the force extracting the tape from the cartridge. The tape cannot withstand a longitudinal stress because of its flexibility. Therefore, the force exerted on the tape is resisted by increased tension in the tape which tends to extract the tape from the cartridge 39 more rapidly.

FIGS. 7, 8, and 9 illustrate the extraction (or retraction, taking the figures in reverse order) of the tape from a cartridge mounted in mounting position 2. In FIG. 7, the partial vacuum normally maintained in cartridge storage chamber air manifold 106 and transmitted to the bottom of tape storage chambers 111 has been released, and a slight positive pressure (greater than atmospheric) has been applied; thus the tension in the tape created by the vacuum has been destroyed. A positive pressure and air flow from slots 123 has created a positive pressure within the small loop or bubble of tape above sleeve 50 and the tape is being extracted from the cartridge. As the area of tape exposed to the differential pressure between the interior and exterior of this small bubble increases, the total force on the tape is increased, the tension in the tape at sleeve 50 is increased, and the tape is therefore extracted more rapidly. When the length of the tape loop above the cartridge has increased to that illustrated in FIG. 8, the effect of low pneumatic pressures in the vacuum chambers assists in completing the tape extraction. There is one characteristic of the tape configuration in FIG. 8 which is particularly noteworthy; that is the ballooning of the tape as the expanding tape bubble builds up toward the capstan region 45. The only exhaust path for air which escapes from the interior of the tape loop past the partial seal between the edges of the tape and front and rear wall surfaces 33 and 35 is through ports 61 and 63 in the vacuum chambers. Therefore, even without the presence of a partial vacuum in vacuum chambers 41 and 43, the tape loop will balloon upward toward the vacuum chambers and will not tend to fill the mounting post region 47. It is, however, advantageous to have a pneumatic vacuum present in the vacuum chambers when the tape loop approaches the configuration shown in FIG. 8. When the tape loop "-seals" the vacuum chambers from the capstan region 45 by contact with the chamber walls in the vicinity of points 80 and 80', the full effect of the vacuum chamber pressures will be operative to completely extract the remainder of the tape still in the cartridge. The tape loop will then assume the configuration shown in FIG. 9. When the tape comes in contact with the surface of capstan 51, it will begin to be transported. The capstan will assist in pulling the tape out of one of the tape storage chambers 111 in the cartridge and feeding it into one of the vacuum chambers. It may appear that one of the vacuum chambers will have an excessive length of tape when the tape is completely extracted from the cartridge; however, the lengths of the smaller loops of tape in each of the vacuum chambers will quickly balance because of differences in tension of the tape in the two vacuum chambers.

Since in normal operation the tape is in non-sliding frictional contact with the surface of capstan 51, differences in tension of the tape in the two vacuum chambers is not felt past the capstan surface; however, these tension forces are equalized by relative movement of tape from one chamber to the other around cartridge mounting sleeve 50.

The low pressure in the vacuum chambers is created by vacuum existing in vacuum chamber manifold 65 being transmitted to the vacuum chambers by vacuum chamber air ports 61 and 63 assisted by vacuum chamber air grooves 83. The purpose of air grooves 83 is to aid the air throttling effect on the tape as discussed previously in connection with FIGS. 1 and 2 and to prevent the vacuum port 61 from exerting drag forces on the tape. When the tape loop is drawn into vacuum chambers 41 and 43 the tape will come in frictional contact with the continuously rotating capstan 51 and quickly accelerate to the capstan surface velocity. Capstan surface air grooves 101 provide an escape passage for any air which may become trapped between the tape and the capstan surface. Such air would cause uneven tensile forces to be transmitted to different portions of the tape.

There is sufficient air flow from slots 123 into the interior of the tape loop while the loop is being transported by the capstan so that the edges of the tape ride on a partial air bearing created by the escape of a small amount of air between the edges of the tape and front and rear surfaces 33 and 35. Therefore, frictional wear and drag of the tape against the transport walls is slight. The length of the tape loop in each of the two chambers is maintained equal by differential tensile forces in the tape tending always to bring the tape loops into balance.

In order to assure that the reading and writing rate shall be constant, two areas of control exist. One area of control is to maintain a constant capstan velocity. In the embodiment presented, the capstan is continuously rotated at a constant angular velocity at all times when the system is in operation. Any conventional constant speed driving means may be used. The second area of control of the reading and writing rate is to assure that there will be little or no relative movement of nearby points on the information storage medium as the medium passes the transducer. This may be accomplished by maintaining a relatively constant and uniform tension in the magnetic tape loop. The means whereby a constant and uniform tension is maintained in the tape is the same as the means used to keep the lengths of the loop of tape in each of the chambers 41 and 43 equal. This is done by effecting a change in the force on that portion of the tape in each of the chambers depending on the total length of tape in that chamber. The change in force on the tape changes the tensile stress or tension in the tape as discussed previously. Any unbalance in the tensile forces in the tape in the two chambers is quickly accompanied by a relative movement of tape from the chamber having tape with the lower tensile force around cartridge mounting sleeve 50 to the chamber with the higher tensile force tape thereby balancing the tensile forces and maintaining constant and uniform tension in the tape.

Therefore, if the tape is in the form of an endless loop and there are two vacuum chambers of the same or mirror image configurations, then, for the general system configuration shown in FIG. 3, an increase in tape length in one chamber will correspond to an equal decrease in tape length in the other chamber. Further, if individual endless tape loops in each of the cartridges present in the system are of a given total length, then the principles discussed here will be the same for any selected tape loop. As the length of tape in the chamber increases, there is a decrease in the vacuum (i.e. an increase in the pressure) present in the chamber and therefore a decrease in the total force tending to draw more tape into the chamber (transmitted by a decreased tensile force or tension in the tape). With two chambers cooperating with each other, as shown, it can be seen that there is a positive equalization of the tape lengths in the chambers.

The automatic changing of the vacuum chamber effective pressure corresponding to a change in tape length in the chamber is accomplished by throttling the escape of air from the chamber through ports 61 (assisted by grooves 83) into vacuum chamber manifold 65. The pressure in manifold 65 is maintained constant by any suitable pneumatic evacuation means. The design of ports 61 and 63 and grooves 83 is such that the major portion of the air evacuation of the chamber is through ports 61. As the tape length in vacuum chamber 41 increases, the effective cross sectional area of the air passage through ports 61 is decreased until it is reduced to the cross sectional area of grooves 83. At the same time, tape is being drawn out of the other vacuum chamber so that the effective cross sectional area of air passage is increased to the cross sectional area of ports 61.

It can be seen therefore that the tension in the tape as the tape approaches the transducer area is maintained constant by equalizing forces on the tape effected by changing the relative tape length in the chambers. Such changes in tape length will be effected by relative movement of the tape through the lower loop of the tape over the cartridge mounting sleeve 50 rather than through the surface of capstan 51 since the capstan is rotating in a constant angular velocity and there is zero velocity on the tape relative to the capstan surface. Thus, the novel vacuum chamber arrangement has provided an automatic tape balancing which will maintain constant tape tension as the tape approaches the transducer heads 53 and 55.

The tape will be traveling in constant velocity when it reaches point 71 with little or no flutter motion. Rapid variations in tape tension and flutter in the tape are reduced or eliminated by the balancing process described above and by the effect of tape stabilizing plates 57 and 59 which assure that a constant and steady capstan driving force will be present in the tape at the transducer heads 53 and 55.

The tape rides on air bearings throughout most of its travel from the transducer head 53 through the vacuum chambers and around cartridge mounting sleeve 50. During normal operation the tape leaves the cartridge 39 and approaches the vacuum chamber side wall at approximately point 80 and rides on an air bearing around this curved portion of the wall. There is sufficient boundary layer air thickness being carried by the tape so that the air bearing will be self sustaining in this area; however, to reduce drag, it may be advantageous to supply air along this wall surface through a series of ports or slots.

When a particular loop of tape has been selected to be transported and there is a loop of tape presently being transported, it is necessary first to retract the tape no longer needed back into its cartridge before the next tape can be transported. However, these operations may overlap to some extent. When the reading or recording on the particular tape is completed, the vacuum on the vacuum chambers 41 and 43 is released to atmospheric pressure while vacuum is applied at cartridge air manifold ports 109 associated with the tape being retracted. At about the same time, vacuum is released at cartridge air manifold ports 109 of the selected tape cartridge and a slight positive air pressure is applied. Thus the first tape is retracted rapidly into its cartridge and the newly selected tape is positioned in the chambers 41 and 43. Since there is a partial pneumatic seal between the tape and the surfaces 33 and 35, provision must be made to allow escape of the air within the tape loop as it is retracted. This may be through cartridge mounting sleeve slots 123 or through ports (not shown) in the back plate 35 of the system which open automatically as a tape loop is being retracted. In this second case, it must be understood that the overlapping of the retraction of one tape loop and the extraction of another may have to be reduced due to the escape of air from ports 123 of the selected tape cartridge through ports in the back plate 35.

It should be understood that the direction of tape movement is arbitrary and could be driven in the opposite direction to that described with appropriate modification of the transducer arrangement.

It may be desirable to have the circular array of cartridges extend throughout 360° rather than just 60° (approximately) utilized by the ten cartridge positions illustrated. For example, these cartridges could be placed on a movable wheel so that any 10 consecutive cartridge positions on the periphery of the wheel would be in operable position to supply tape to the system.

It will be obvious to those skilled in the art that the present invention is not limited to the use of magnetic tape, and any flexible web material capable of having information stored thereon may be utilized; for example, thermoplastic or optical reading and recording techniques may be utilized with equal facility.

There has been described a selective access information storage and retrieval system. The system is selective in that a particular relatively small portion of the information storage medium may be directly addressed and information retrieved from or stored on a preselected location on that portion of the medium.

While the principles of the invention have now been made clear in illustrative embodiments, there will be immediately obvious to those skilled in the art many modifications in structure, arrangement, proportions, the elements, materials, and components used in the practice of the invention, and otherwise, which are particularly adapted for specific environments and operating requirements, without departing from those principles. The appended claims are therefore intended to cover the embrace any such modifications, within the limits only of the true spirit and scope of the invention.

What is claimed as new and desired to secure by letters patent of the United States is:

1. An information storage and retrieval system comprising, a flexible web material for storing coded information thereon, a pneumatic chamber for pneumatically drawing said web material into said chamber, and a web driving means positioned within said chamber for transporting said web material only when said material is pneumatically drawn into said chamber.

2. An information storage and retrieval system comprising, an endless flexible web material for storing coded information thereon, a pneumatic chamber for pneumatically drawing said endless web material into said chamber, and a capstan positioned within said chamber for transporting said endless material only when said material is pneumatically drawn into said chamber.

3. An information storage and retrieval system comprising, an endless magnetic tape for storing coded information thereon, a pneumatic chamber for pneumatically drawing said magnetic tape into said chamber, and a continuously rotating capstan positioned within said chamber for contacting and transporting said magnetic tape only when said material is pneumatically drawn into said chamber.

4. An information storage and retrieval system comprising, an endless flexible web material for storing coded information thereon, a pneumatic chamber for pneumatically drawing said web material into said chamber, transducing means positioned within said pneumatic chamber for reading and writing coded information on said flexible web material, and a web driving means positioned within said chamber for transporting said web material only when said material is pneumatically drawn into said chamber.

5. An information storage and retrieval system comprising, an endless magnetic tape for storing coded information thereon, a pneumatic chamber for pneumatically drawing said magnetic tape into said chamber, transducing means positioned within said pneumatic chamber for reading and writing coded information on said magnetic tape, and a continuously rotating capstan positioned within said chamber for contacting and transporting said magnetic tape only when said magnetic tape is pneumatically drawn into said chamber.

6. In an information search and retrieval system, a flexible web tensioning apparatus comprising, a first pneumatic chamber for pneumatically drawing flexible web material into said first chamber, a second pneumatic chamber for pneumatically drawing flexible web material into said second chamber, a partition positioned between said pneumatic chambers, a web transporting means positioned between said pneumatic chambers and adjacent said partition, means defining ports in said partition, at least one of said ports opening into said first chamber and another of said ports opening into said second chamber, said ports positioned to permit flexible web material to cover said ports in proportion to the extent said material is drawn into said chambers.

7. In an information search and retrieval system, an endless flexible web tensioning apparatus comprising, a first pneumatic chamber for pneumatically drawing flexible web material into said first chamber, a second pneumatic chamber for pneumatically drawing flexible web material into said second chamber, a partition positioned between said pneumatic chambers, a continuously rotating capstan positioned between said pneumatic chambers and adjacent said partition for contacting and transporting said web material when said material is pneumatically drawn into said chambers, means defining ports in said partition, at least one of said ports opening into said first chamber and another of said ports opening into said second chamber, said ports positioned to permit flexible web material to cover said ports in proportion to the extent said material is drawn into said chambers.

8. In an information search and retrieval system, an endless flexible web tensioning apparatus comprising, a first vacuum chamber for pneumatically drawing flexible web material into said first chamber, a second vacuum chamber for pneumatically drawing flexible web material into said second chamber, a partition positioned between said vacuum chambers, a continuously rotating capstan positioned between said vacuum chambers and adjacent said partition for contacting and transporting said web material when said material is pneumatically drawn into said chambers, means defining ports in said partition, at least one of said ports opening into said first chamber and another of said ports opening into said second chamber, said ports positioned to permit flexible web material to cover said ports in proportion to the extent said material is drawn into said chambers, and means pneumatically connecting said ports to a source of vacuum.

9. In a magnetic tape recording system, a magnetic tape tensioning apparatus comprising, a first vacuum chamber for pneumatically drawing magnetic tape into said first chamber, a second vacuum chamber for pneumatically drawing magnetic tape into said second chamber, a partition positioned between said vacuum chambers, a magnetic tape transporting means positioned between said vacuum chambers and adjacent said partition, means defining ports in said partition, at least one of said ports opening into said first chamber and another of said ports opening into said second chamber, said ports positioned to permit magnetic tape to cover said ports in proportion to the extent said magnetic tape is drawn into said chambers, and means pneumatically connecting said ports to a source of vacuum.

10. An information storage and retrieval system comprising, a plurality of cartridges each containing flexible web material for storing coded information thereon, a pneumatic chamber coupled to said cartridge, means for pneumatically drawing flexible web material from a selected one of said cartridges into said chamber, and a web driving means positioned within said chamber for transporting said web material when said material is pneumatically dawn into said chamber.

11. An information search and retrieval system comprising, a plurality of cartridges each containing magnetic tape for storing coded information thereon, a pneumatic chamber coupled to said cartridges, means for pneumatically drawing magnetic tape from a selected one of said cartridges into said chamber, a continuously rotating capstan positioned within said chamber for transporting said magnetic tape when said tape is pneumatically drawn into said chamber.

12. An information search and retrieval system comprising, a plurality of cartridges each containing an endless loop of magnetic tape for storing coded information thereon, a vacuum chamber, means for pneumatically drawing a selected one of said endless loops of magnetic tape into said chamber, a transducing means positioned within said vacuum chamber for reading and writing coded information on said magnetic tape, and a continuously rotating capstan positioned within said chamber for contacting and transporting said magnetic tape when said magnetic tape is pneumatically drawn into said chamber.

13. An information search and retrieval system comprising, a plurality of cartridges each containing an endless loop of flexible web material for storing coded information thereon, a first vacuum chamber for pneumatically drawing a selected one of said endless loops of flexible web material into said chamber, a second vacuum chamber positioned adjacent said first vacuum chamber for pneumatically drawing said selected one of said endless loops of flexible web material into said second chamber, a partition positioned between said pneumatic chambers, a web transporting means positioned between said pneumatic chambers and adjacent said partition, means defining ports in said partition, at least one of said ports opening into said first chamber and another of said ports opening into said second chamber, said ports positioned to permit said selected one of said endless loops of flexible web material to cover said ports in proportion to the extent said web is drawn into said chambers.

14. An information search and retrieval system comprising, a plurality of cartridges each containing an endless loop of flexible web material for storing coded information thereon, a first vacuum chamber for pneumatically drawing a selected one of said endless loops of flexible web material into said chamber, a second vacuum chamber positioned adjacent said first vacuum chamber for pneumatically drawing said selected one of said endless loops of flexible web material into said second chamber, a partition positioned between said pneumatic chambers, transducing means supported by said partition for reading and writing coded information on said flexible web material, a continuously rotating capstan positioned between said pneumatic chambers and adjacent said partition for contacting and transporting said flexible web material when said material is pneumatically drawn into said chambers, means defining ports in said partition, at least one of said ports opening into said first chamber and another of said ports opening into said second chamber, said ports positioned to permit said selected one of said endless loops of flexible web material to cover said ports in proportion to the extent said web is drawn into said chambers.

15. An information storage and retrieval system comprising, a plurality of cartridges each containing an endless loop of magnetic tape for storing coded information thereon, a first vacuum chamber for pneumatically drawing a selected one of said endless loops of magnetic tape into said chamber, a second vacuum chamber positioned adjacent said first vacuum chamber for pneumatically drawing said selected one of said endless loops of magnetic tape into said second chamber, a partition positioned between said pneumatic chambers, transducing means supported by said partition for reading and writing coded information on said magnetic tape, a continuously rotating capstan positioned between said vacuum chambers and adjacent said partition for contacting and transporting said magnetic tape when said tape is pneumatically drawn into said chambers, means defining ports in said partition, at least one of said ports opening into said first chamber and another of said ports opening into said second chamber, said ports positioned to permit said selected one of said endless loops of magnetic tape to cover said ports in proportion to the extent said tape is drawn into said chambers, and means pneumatically connecting said ports to a source of vacuum.

16. In an information search and retrieval system including endless loops of flexible web material, a cartridge for containing an endless loop of flexible web material comprising, a container having side walls, a bottom, and an open top, a partition within said container extending upward from the bottom for dividing the container into two storage chambers, a cartridge mounting sleeve positioned above the open top of said container for mounting said cartridge on an information search and retrieval system, means defining ports in said mounting sleeve and in said container bottom, and means connecting said ports to a source of pneumatic pressure.

17. In an information search and retrieval system including endless loops of flexible web material, a cartridge for containing an endless loop of flexible web material comprising, a container having side walls, a bottom, and an open top, said side walls arranged to form a container having a rectangular cross section, a partition within said container extending upward from the bottom for dividing the container into two storage chambers, a cylindrical cartridge mounting sleeve positioned above the open top of said container and having an axis transverse to said one side wall and parallel to said partition, means defining ports in said mounting sleeve for admitting air under pressure to establish an air bearing between said sleeve and said flexible web material, and means defining ports in the bottom of said container for admitting a negative pressure to attract said flexible web material and for admitting a positive pressure to repel said flexible web material.

18. In an information search and retrieval system including endless loops of magnetic tape, a cartridge for containing an endless loop of magnetic tape comprising, a container having side walls, a bottom, and an open top, said side walls arranged to form a container having a rectangular cross section, a partition within said container extending upward from the bottom for dividing the container into two storage chambers, a cylindrical cartridge mounting sleeve positioned above the open top of said container and having an axis transverse to said container and parallel to said partition, means defining air bearing ports in said mounting sleeve for admitting air under pressure to establish an air bearing between said sleeve and said magnetic tape, a source of air pressure connected to said air bearing ports, means defining pneumatic ports in the bottom of said container for admitting a negative pressure to attract said magnetic tape and for admitting a positive pressure to repel said magnetic tape, and a source of pneumatic pressure connected to said pneumatic ports.

19. In an information search and retrieval system including endless loops of flexible web material, a cartridge for containing an endless loop of flexible web material comprising, a container having side walls, a bottom, and an open top, means defining ports in said bottom, means for supplying a pneumatic pressure to said ports, a cylindrical cartridge mounting sleeve, means supporting said mounting sleeve above said open top, means defining ports in said mounting sleeve, and means for supplying a pneumatic pressure to said mounting sleeve ports.

20. In an information search and retrieval system, a tape tensioning apparatus comprising, a flexible tape, means including walls defining first and second pneumatic chambers, means for effecting a pneumatic pressure differential on opposite surfaces of said flexible tape whereby a portion of said flexible web is disposed into each of said pneumatic chambers, and means defining at least one port in a wall of each of said pneumatic chambers, said port positioned to permit said flexible tape to cover said port to an amount proportional to the extent said tape is disposed within said chambers.

21. In an information search and retrieval system, a tape tensioning apparatus comprising, a flexible web material, means including walls defining first and second pneumatic chambers, means for effecting a pneumatic pressure differential on opposite surfaces of said flexible web material whereby a portion of said flexible web material is drawn into each of said pneumatic chambers, means defining first and second ports respectively connecting said first and second chambers to a source of reduced pneumatic pressure, said ports positioned respectively within a wall of said of said chambers to permit said flexible web material to cover said ports to an amount proportional to the extent said web material is disposed within said chambers.

22. In an information search and retrieval system, a flexible web tensioning apparatus including a flexible web comprising, means including walls defining first and second pneumatic chambers, means for effecting a pneumatic pressure differential on opposite surfaces of said flexible web whereby loops of said flexible web are disposed within each of said pneumatic chambers, and means defining at least one port in a wall of each of said pneumatic chambers, each port positioned to permit said flexible web to cover said port to an amount corresponding to the extent said loop of flexible web is disposed within said chamber to thereby vary the effective area of said port.

23. An information storage and retrieval system comprising a flexible tape, a cartridge for storing said tape, means including a wall defining a pneumatic chamber coupled to said cartridge, means for creating a pneumatic pressure differential on opposite surfaces of said tape to thereby effect the substantial transfer of said tape between said chamber and said cartridge, driving means for transporting said tape within said chamber, and means defining a port within said wall, said port positioned to permit said tape to cover said port to an extent corresponding to the position of said tape within said chamber.

24. An information storage and retrieval system comprising a flexible tape, a cartridge for storing said tape, means including walls defining first and second pneumatic chambers coupled to said cartridge, means for creating a pneumatic pressure differential on opposite surfaces of said tape to draw said tape substantially from said cartridge into said chambers, driving means for transporting said tape within said chambers, and means defining a port within a wall of each of said chambers, said port positioned to permit said tape to cover said port to an extent corresponding to the position of said tape within said chamber.

25. An information storage and retrieval system comprising a flexible tape, means including walls defining first and second pneumatic chambers, means for effecting a pneumatic pressure differential on opposite surfaces of said tape for drawing a loop of said tape into each of said chambers, a tape transporting means disposed intermediate said chambers on the low pressure side of said tape for transporting said tape when said tape has been drawn into said chambers, and a transducer positioned contiguously to a wall of one of said chambers and in contact with said tape, said contact between said tape and said transducer resulting from the action of said differential pressure acting on said tape.

26. An information storage and retrieval system comprising a flexible tape, means including walls defining a pneumatic chamber, a tape driving means within said chamber, a transducer disposed contiguously to a wall of said chamber, and means for effecting a pneumatic pressure differential on opposite surfaces of said tape to thereby draw said tape into said chamber to be transported by said tape driving means, said pneumatic pressure differential also acting to maintain said tape in substantial contact with said transducer.

27. An information storage and retrieval system comprising a plurality of cartridges each containing a flexible tape for the storage of coded information thereon, a pneumatic chamber, means for effecting a pneumatic pressure differential on opposite surfaces of a tape in a selected one of said cartridges for drawing a loop of said tape into said chamber, and a transducer and a tape driving means each positioned within said chamber on the low pressure side of said tape whereby said tape is maintained in substantial contact with said transducer through the force of said pressure differential acting on said tape.

28. In an information processing apparatus, a tape handler means comprising, a substantially air-tight enclosure including means to store at least one loop of an elongated tape adapted to store information along a portion of said loop, an information processing station within said enclosure including transducer means to transfer said information, and fluid control means for moving tape in said enclosure to said information processing station, whereby said elongated tape is moved out of said means to store said loop past said information processing station in a predetermined mode of operation when the fluid control means is actuated in accordance with a predetermined schedule.

29. In an information processing apparatus, a tape handler means comprising, a substantially air-tight enclosure including means to store a plurality of storage loops of elongated tape adapted to store information along portions thereof, an information processing station within said enclosure including transducer means to transfer said information supported in a predetermined position within said enclosure relative to the means to store a plurality of loops, means to define a chamber within said enclosure on the opposite side of said information station from said means to store a plurality of loops, and fluid control means for selectively moving one of said loops to said information processing station, whereby an elongated tape is moved past said information processing station in a predetermined mode of operation when the fluid control means is actuated in accordance with a predetermined schedule.

* * * * *